UNITED STATES PATENT OFFICE.

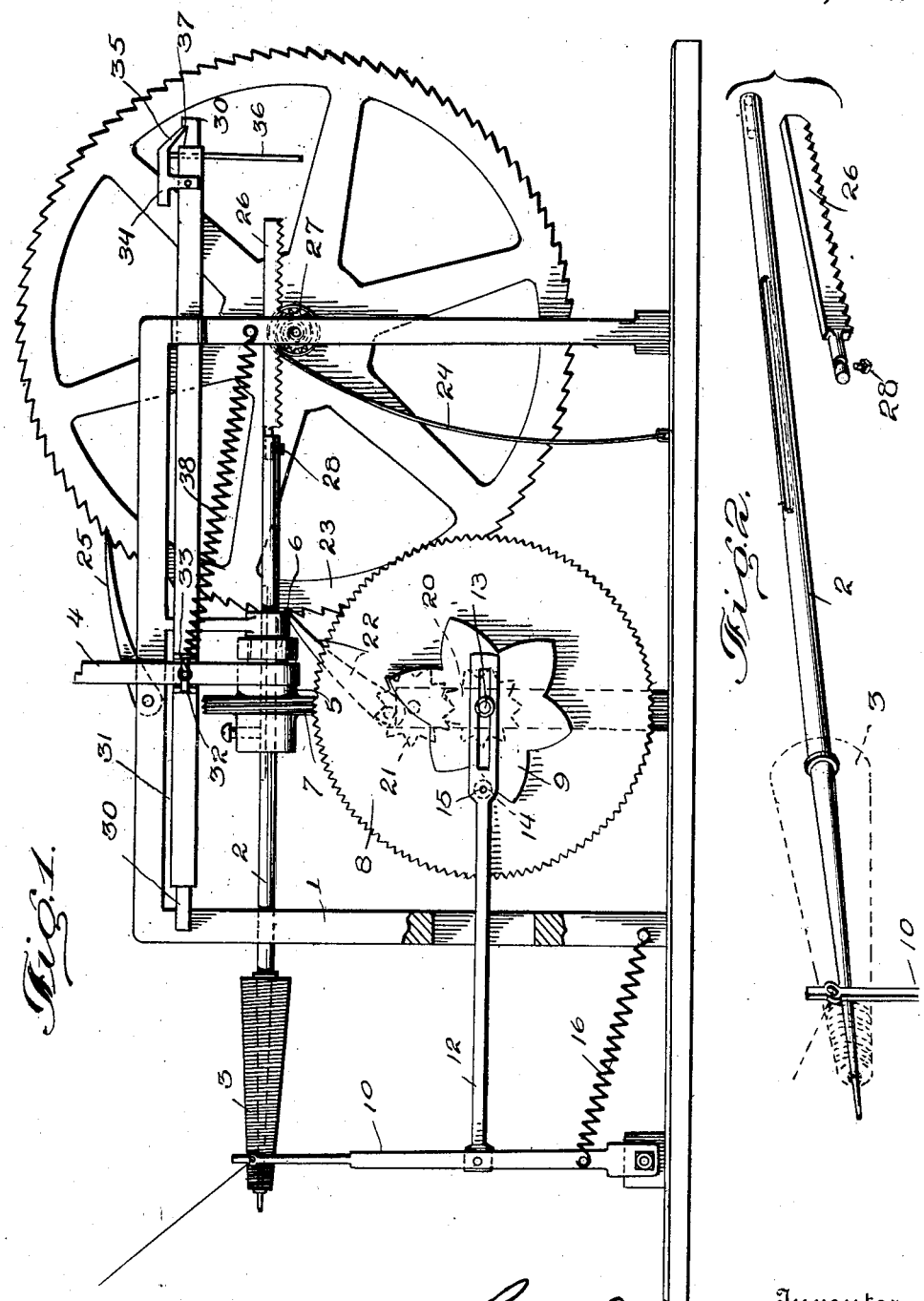

PETER SAURUSAITIS, OF WATERBURY, CONNECTICUT.

BOBBIN-WINDER.

1,360,802.　　　　　Specification of Letters Patent.　　Patented Nov. 30, 1920.

Application filed July 16, 1917. Serial No. 180,807.

*To all whom it may concern:*

Be it known that I, PETER SAURUSAITIS, of Waterbury, in the county of New Haven and State of Connecticut, have invented certain new and useful Improvements in Bobbin-Winders; and I do hereby declare the following to be a full, clear, and exact description of the invention, such as will enable others skilled in the art to which it appertains to make and use the same.

My invention relates to bobbin winders, and the object of the invention is to provide a simple and highly efficient device of this character particularly adapted for winding a single bobbin, the winder being primarily designed for use with a weaving machine, being readily fitted to the machine so that the power for driving the latter may be used to operate the winder.

In the accompanying drawings, Figure 1 is a view in side elevation. Fig. 2 shows the spindle and its rack in detail.

Suitably supported in a frame 1 in manner to permit of longitudinal movement is a spindle 2 upon one end of which a spool or bobbin 3 is removably secured. Rotation of the spindle is effected through the instrumentality of a belt 4 and a pulley 5, the latter being keyed to the spindle so as to permit the latter to slide longitudinally thereof. Loosely mounted on the spindle is a second pulley 6 to which the belt may be shifted when the winding of a spool is completed. About centrally of its length the pulley 5 is formed with a worm 7 which is adapted to drive a gear 8 mounted in the frame 1 and to which is fixedly attached an irregular cam 9 which controls the movement of a pivoted thread guide 10 through a link 12, one end of which latter is connected to the guide and the other slidably supported by the shaft 13 of the gear 8. A roller 14 supported by a stud 15 projecting laterally from the link engages with the cam edges and in the normal constant rotation of the cam produces reciprocation of the thread guide, the irregularly formed cam edges causing strokes of varying length and insuring a compactly filled bobbin. A spring 16 secured to the guide and to the frame maintains the roller 14 in engagement with the cam.

20 designates a spur gear integrally mounted on the shaft 13 opposite the gear 8. This spur gear is designed to mesh with a superposed spur 21 suitably journaled in the spindle supporting the shaft 13, and carrying a pawl 22 having its pivot at one side of the center of the spur 21, the pawl being adapted to engage ratchet wheel 23 suitably supported in the frame 1. Rotation of the pawl-spur 21 effects the intermittent turning of the wheel 23 in clockwise direction. Wound about the shaft of the wheel 23, with its inner end fixedly secured to such shaft, is a coiled spring 24, the other end of the spring being appropriately fastened to a portion of the frame 1. As the wheel 23 is moved by the pawl the spring is gradually tensioned. A second pawl 25 pivoted to the frame engages the teeth of the wheel 23 to prevent back movement of the wheel under tension of its spring.

The spindle 2 at the end opposite the spool bearing carries a rack 26 which engages with a pinion 27 driven by the wheel 23, the rack having a slip connection 28 with the spindle to permit it to maintain engagement with the pinion to effect gradual and intermittent retraction of the spindle as the latter is rotated to wind the thread on the spool.

In order that the operation of the parts before described may be automatically stopped when the spool is filled I provide a kick-off mechanism which includes a rod 30 one end of which is rigidly secured to the frame 1, and on which is mounted a sleeve 31 having laterally extending spaced apart arms 32, 33, forming a shifting means for the belt 4. At the outer end of the sleeve is a pivoted member 34 having a latch 35 and a trip-arm 36, the former engaging a notch 37 of rod 30. The trip-arm lies in the path of the rack 26 of the spindle and when the latter reaches the end of its inward movement it strikes the trip-arm turning the member 34 on its pivot and disengaging the latch from the notched end of the rod. This causes the sleeve, through the action of a spring 38 secured thereto and to the frame 1, to slide along the rod, the arm 32 drawing the belt 4 from the hub of the pulley 5 and causing it to engage the loose pulley 6, such action bringing the mechanism to a stop. By removing the pawls 22 and 25 from engagement with the wheel 23, the latter, under the action of the spring 24, will return the spindle and its rack to initial position. The sleeve is then returned to its original position, the latch 35 taking in the notch 37. The return of the sleeve to its original position causes the belt to be moved to engagement with the pulley 5.

The operation of the machine will be clearly understood from the foregoing.

I claim as my invention:

1. Winding mechanism for bobbins including a spindle, a thread guide, means for rotating the spindle, means for retracting the spindle relative to said thread guide, and means in part carried by said spindle and rotating therewith for actuating said last mentioned means.

2. Winding mechanism for bobbins including a spindle, a thread guide, means for rotating the spindle, means for retracting the spindle relative to said thread guide as the spindle is rotated, means for effecting the reciprocation of said thread guide, and means in part carried by said spindle and rotating therewith for actuating said retracting means and said reciprocating means.

3. Winding mechanism for bobbins including a spindle on which the bobbin is mounted, means for rotating the spindle, means for moving the spindle longitudinally as it is rotated, and means actuated by the spindle at its limit of movement in one direction for rendering said rotating means inoperative.

4. Winding mechanism for bobbins including a spindle on which the bobbin is mounted, a thread guide, means for rotating the spindle, means actuated by said spindle rotating means for reciprocating said thread guide, means for moving the spindle longitudinally in one direction as it is rotated, and means actuated by the spindle at its limit of movement in one direction for rendering said rotating means inoperative.

5. Winding mechanism for bobbins including a spindle on which the bobbin is mounted, a pivoted thread guide, means for rotating the spindle, means actuated by said spindle rotating means for effecting an intermittent longitudinal movement of the spindle in one direction as it is rotated, means also controlled by said spindle rotating means for effecting a varying reciprocation of said pivoted thread guide, and means actuated by said spindle at the limit of its intermittent movement for rendering its rotating means inoperative.

6. Winding mechanism for bobbins including a spindle on which the bobbin is mounted, a pivoted thread guide, means for rotating the spindle, means actuated by said spindle rotating means for effecting an intermittent longitudinal movement of the spindle in one direction as it is rotated, means also controlled by said spindle rotating means for effecting a varying reciprocation of said pivoted thread guide, means actuated by said spindle at the limit of its intermittent movement for rendering its rotating means inoperative, and spring tension means for reversing the longitudinal movement of said spindle.

7. Winding mechanism for bobbins including a longitudinally movable spindle having a rack, a pinion in engagement with said rack, a ratchet actuating said pinion, a member for rotating said spindle having a sliding connection therewith, a worm carried by said member, gearing actuated by said worm and adapted to drive said ratchet, and trip mechanism controlled by said spindle for rendering the spindle rotating member inoperative.

8. Winding mechanism for bobbins including a longitudinally movable spindle having a spool bearing at one end and a rack at its opposite end, a pinion in engagement with said rack, a ratchet controlling said pinion, a pulley slidably keyed on said spindle, a power belt for driving said pulley, a worm actuated by said pulley, gearing in mesh with said worm adapted to drive said ratchet, and means for controlling the position of said belt, including a fixed member, a spring held sleeve slidable thereon and having belt engaging arms, and a latch for holding said sleeve to cause said belt to engage said pulley, said latch having a depending portion adapted to be engaged by said spindle to trip said latch to permit movement of said sleeve to shift the belt.

9. Winding mechanism for bobbins including a longitudinally movable spindle having a spool bearing at one end and a rack at its opposite end, a pinion in engagement with said rack, a ratchet controlling said pinion, a pulley slidably keyed on said spindle, a power belt for driving said pulley, a worm actuated by said pulley, gearing in mesh with said worm adapted to drive said ratchet, a thread guide, cam mechanism for reciprocating said guide actuated by said gearing, belt shifting means including a fixed member, a spring held member slidable thereon, and a latch for holding said slidable member against the tension of its spring, said latch having a depending portion adapted to be engaged by said spindle to trip said latch and render the belt shifting means operative.

In testimony whereof I have signed this specification in the presence of two subscribing witnesses.

PETER SAURUSAITIS.

Witnesses:
E. P. ATWOOD,
EDWARD G. BOBBIN.